(No Model.) 2 Sheets—Sheet 1.
W. A. PITT.
STEAM ENGINE FOR EQUALIZING POWER.
No. 383,764. Patented May 29, 1888.
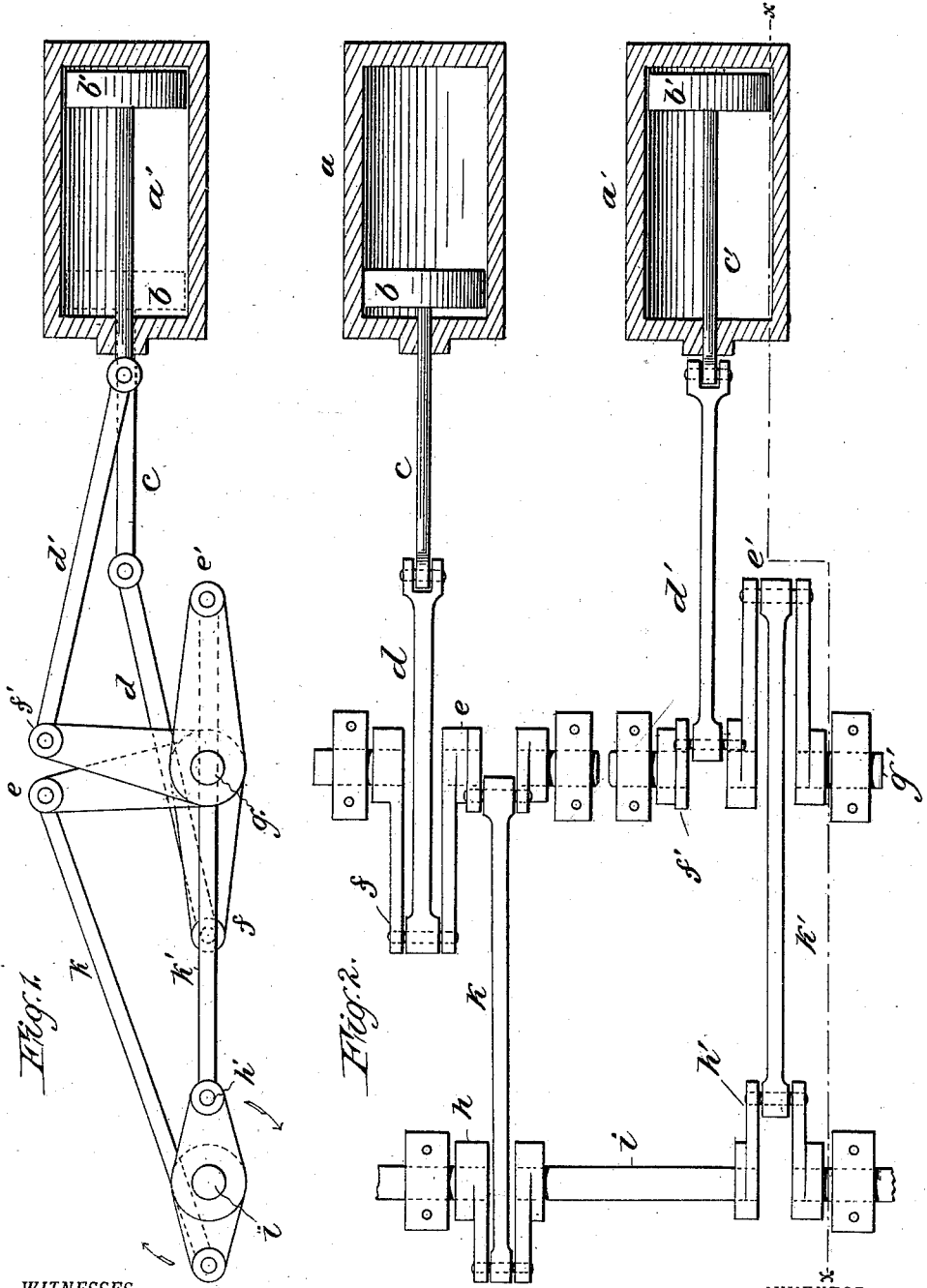

(No Model.) 2 Sheets—Sheet 2.
W. A. PITT.
STEAM ENGINE FOR EQUALIZING POWER.
No. 383,764. Patented May 29, 1888.
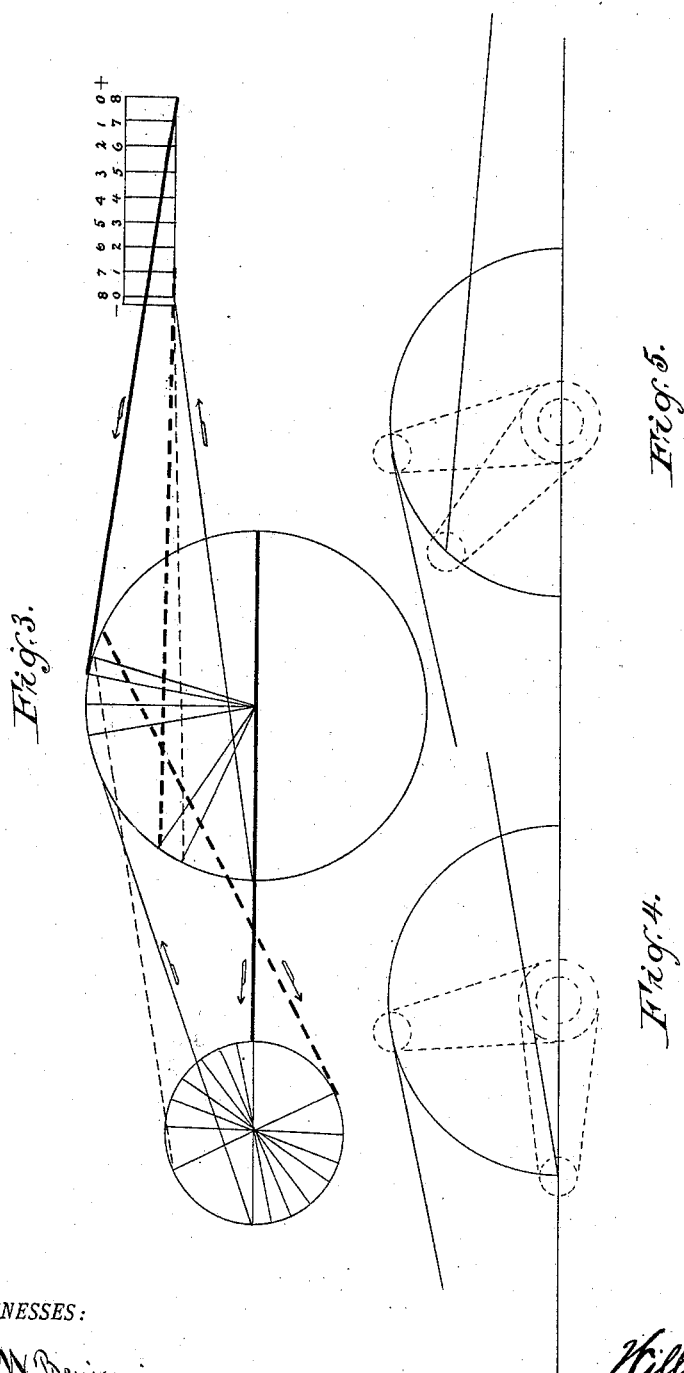

UNITED STATES PATENT OFFICE.

WILLIAM A. PITT, OF GLENBROOK, CONNECTICUT.

STEAM-ENGINE FOR EQUALIZING POWER.

SPECIFICATION forming part of Letters Patent No. 383,764, dated May 29, 1888.

Application filed December 15, 1887. Serial No. 253,017. (No model.)

*To all whom it may concern:*

Be it known that I, WILLIAM A. PITT, a citizen of the United States, residing at Glenbrook, in the county of Fairfield and State of Connecticut, have invented certain new and useful Improvements in Steam-Engines for Equalizing Power, of which the following is a specification.

In the drawings, Figure 1 is a side elevation, Fig. 2 is a plan, and Fig. 3 is a diagram, of my invention.

The purpose of my improvement is to provide means for the utilization of elastic forces in their most expanded state with a result equal to that obtained in the present style of engines, where such elastic forces are allowed to operate by their full initial pressure throughout the entire movement, and this I attain by a peculiar arrangement of cranks or levers, as will be hereinafter fully set forth.

Referring to the drawings, $a$ $a'$ represent two cylinders set in the same horizontal plane, and $b$ $b'$ the respective pistons of the same.

$c$ $c'$ are the piston-rods, which are connected, by means of the rods $d$ $d'$, with the two cranks $f$ $f'$, each of which is mounted on an independent cross shaft, $g$ $g'$. On each of these shafts $g$ $g'$ is mounted another crank, $e$ $e'$, which cranks are connected by rods $k$ $k'$ with other cranks, $h$ $h'$, set on the work-shaft $i$. The cranks $f$ and $e$ and cranks $f'$ and $e'$ are set at a little less than right angles to each other, and work in opposite directions one to the other. The independent shafts $g$ and $g'$ and the working-shaft $i$ are set in the same horizontal plane to each other, and the two steam-cylinders $a$ $a'$ are placed so that the center points of their piston-rods are in a plane horizontal to and above the plane of the shafts $g$, $g'$, and $i$, and at a distance equal to one-half the length of any of the cranks on the shafts $g$ and $g'$.

It will be observed that the shafts $g$ and $g'$ are set in the same horizontal plane with each other, and with the work-shaft $i$, so that the crank $f$ is on a line with the crank $h$ on the work-shaft, and the crank $e$, carried on the same shaft, is at right angles to the crank $h$, and the cranks $f'$ and $e'$ have the same relative position to the crank $h'$ on the work-shaft. If, instead of intercepting the power and weight with the two sets of intermediate cranks, $e$ $e'$ and $f$ $f'$, when such power and weight are in the same plane, I may place the weight and power at right angles and intercept and connect them with one or with two cranks placed in line, and in the same direction with each other on their respective intermediate shafts and produce the same result.

The operation of the engine is as follows: Steam being admitted into the two cylinders $a$ $a'$ simultaneously, the pistons $b$ $b'$ will be moved in opposite directions, assuming the positions shown in Fig. 2, and so alternately changing their positions one with the other, but moving at different rates of speed one to the other. For instance, starting in the cylinder $a$, the piston $b$ being connected by means of its rod and connecting-rod with the crank $f$, which at the beginning of the stroke lies in a horizontal position to its axis, and the crank $e$ being set at nearly right angles to the crank $f$ on the same shaft, and the latter being connected to the other crank, $h$, on the work-shaft, there results in the forward movement of the piston an exercise of the power with a continual increase of leverage from the start to the finish of the stroke of the piston $b$, the crank $f$ in its horizontal position offering its shortest leverage to the steam-power at the start, where it is nearest to the line of the dead-center of power, and offering the greatest leverage when it is in its vertical position, or where it is farthest from the dead-center of power, at about which point or position it is left at the end of the stroke of the piston $b$ in the cylinder $a$, and when the crank $e$ has traveled through an arc of the same distance from its vertical position where it was most removed from the dead-center of power to a horizontal position to the dead-center of power, thereby working with a continued increase of power from the start to the finish of the stroke of the piston, and so causing the crank $h$ to be moved forward to the right a one-half of a full revolution, where it assumes a position to do the duty ascribed and to be performed by the cylinder $a'$, with its piston $b'$ and connections, conjunctively with the cylinder $a$, as just described, from the start, it having been shown that the several cranks connected with the cylinder $a$ have just been left in a position where they exercise the increased amount of leverage. Any power being applied, I start with this condition with the cylinder $a$, the operation so far as concerns the leverage being in result just the reverse as that described in the other set of cranks; but the power operating such cranks in its cylinder $a'$ is applied to the crank $h'$, and always effecting its power on the crank on the under side of the working-shaft $i$ for one-half of the entire revolution, when its position becomes the same as that heretofore shown, and as operated in the cylinder $a$. It will be seen that by this operation one crank on the working-shaft $i$ is always off of the dead-center, although the cranks are set on the same plane with one another. It will also be observed that the pistons $b$ and $b'$ in their travel move at very different velocities, always ratioing their speed and time with the power effected. While one is operating with a ratio of power from the minimum to the maximum, and doing a lesser work through a greater distance with a less movement of its piston, and consequently a smaller volume of steam, the other is operating just to the reverse, and both cylinders $a$ and $a'$ are transmitting their power to the same work-shaft $i$ through their own intermediate and independent sets of cranks and independent shafts, and thus an equivalent of such power is effected; and by the same conditions in construction I am permitted to use elastic forces to operate such in a most expanded state, with even better result than where said forces are now employed at the full initial pressure upon and throughout the entire movement of the pistons in any given cylinder in its application to any ordinarily-constructed type of engine. In other words, I am able to perform with the most satisfactory results, and without the great loss which now takes place in such engines, the work of the best constructed compound, duplex, triplex, and quadruplex engines in a single cylinder.

Fig. 4 shows the relative position of one pair of cranks and independent shaft as arranged to connect between one cylinder and one crank on the work-shaft.

Fig. 5 shows a pair of similar cranks, as described in Fig. 4, excepting that it may be of advantage to change the position of the crank connected with the steam-cylinder relatively to its shaft to overcome the angularity shown to have taken place with said cranks being set as seen in Fig. 4; but the cranks shown in Figs. 4 and 5 are so set as to operate their power from at a point farthest from the dead-center of power to the dead-center, and vice versa, all movements of such cranks to be confined to the describing of the one-quarter segment of a circle unless a little more or less be required to overcome dead-center points, and is necessary to conform to the requirements occasioned by the angularity of the connecting-rods, as heretofore mentioned.

What I claim as new, and desire to secure by Letters Patent, is—

1. In a steam-engine, the combination, with two cylinders and their piston-rods, of two sets of cranks mounted on independent shafts arranged in the same horizontal plane, two sets of cranks on a common shaft set in line with two of said cranks and connected therewith, and with the two other cranks at right angles thereto, as set forth.

2. The combination, with the cylinders $a$ $a'$ and piston-rods $c$ $c'$, of the cranks $f$ $f'$ and $e$ $e'$, set on independent shafts arranged in the same horizontal plane, connecting-rods $d$ $d'$, cranks $h$ $h'$, set on a common shaft, and rods $k$ $k'$, all arranged as set forth.

WILLIAM A. PITT.

Witnesses:
HERMAN G. LOEW,
K. NEWELL.